United States Patent
Pang et al.

(10) Patent No.: US 7,003,770 B1
(45) Date of Patent: Feb. 21, 2006

(54) METHOD OF DETACHING AND RE-ATTACHING COMPONENTS OF A COMPUTING PROCESS

(75) Inventors: Hwee Hwa Pang, Singapore (SG); Teow Hin Ngair, Singapore (SG)

(73) Assignee: Kent Ridge Digital Labs, (SG)

( * ) Notice: Subject to any disclaimer, the term of this patent is extended or adjusted under 35 U.S.C. 154(b) by 0 days.

(21) Appl. No.: 09/857,171

(22) PCT Filed: Feb. 22, 1999

(86) PCT No.: PCT/SG99/00009

§ 371 (c)(1),
(2), (4) Date: Jun. 15, 2001

(87) PCT Pub. No.: WO00/36508

PCT Pub. Date: Jun. 22, 2000

(30) Foreign Application Priority Data

Dec. 16, 1998 (WO) ..................... PCT/SG98/00102

(51) Int. Cl.
*G06F 9/46* (2006.01)
(52) U.S. Cl. ...................................... 718/100; 719/317
(58) Field of Classification Search ................ 719/314, 719/313; 718/102, 108, 100, 106; 709/202, 709/201

See application file for complete search history.

(56) References Cited

U.S. PATENT DOCUMENTS

| | | | |
|---|---|---|---|
| 3,614,745 A * | 10/1971 | Podvin et al. ............... | 718/104 |
| 4,740,969 A | 4/1988 | Fremont | |
| 4,954,941 A | 9/1990 | Redman | |
| 5,175,828 A | 12/1992 | Hall et al. | |
| 5,199,066 A | 3/1993 | Logan | |
| 5,261,095 A * | 11/1993 | Crawford et al. ........... | 717/149 |
| 5,339,430 A | 8/1994 | Lundin et al. | |
| 5,457,797 A * | 10/1995 | Butterworth et al. ....... | 719/320 |
| 5,548,759 A * | 8/1996 | Lipe ........................... | 707/100 |
| 5,557,736 A | 9/1996 | Hirosawa et al. | |
| 5,590,277 A | 12/1996 | Fuchs et al. | |
| 5,603,031 A | 2/1997 | White et al. | |
| 5,629,980 A | 5/1997 | Stefik et al. | |
| 5,630,047 A | 5/1997 | Wang | |
| 5,659,751 A | 8/1997 | Heninger | |
| 5,664,088 A | 9/1997 | Romanovsky et al. | |
| 5,689,560 A | 11/1997 | Cooper et al. | |
| 5,694,469 A | 12/1997 | Le Rue | |
| 5,696,975 A | 12/1997 | Moore et al. | |
| 5,712,971 A | 1/1998 | Stanfill et al. | |
| 5,724,423 A | 3/1998 | Khello | |
| 5,751,939 A | 5/1998 | Stiffler | |
| 6,085,086 A * | 7/2000 | La Porta et al. ......... | 455/432.3 |

(Continued)

FOREIGN PATENT DOCUMENTS

EP 0762789 3/1997

(Continued)

OTHER PUBLICATIONS

Apple Computer, Inc, Technical Introduction to the Macintosh Family, 2nd ed., Addison-Wesley, 1992, pp. 135-145.*

(Continued)

*Primary Examiner*—Sue Lao
(74) *Attorney, Agent, or Firm*—Greenblum & Bernstein, P.L.C.

(57) ABSTRACT

A method removes a part of a computing process comprising items of data, program code and executing states. The process splits into a first process and a second sub-process. The second sub-process includes a portion of the program code and/or a portion of the execution state of the computing process not required by the first process.

22 Claims, 6 Drawing Sheets

U.S. PATENT DOCUMENTS

| | | | |
|---|---|---|---|
| 6,434,595 B1 * | 8/2002 | Suzuki et al. | 709/202 |
| 6,496,871 B1 * | 12/2002 | Koyama et al. | 719/317 |
| 2004/0059798 A1 * | 3/2004 | Glitho et al. | 709/219 |

FOREIGN PATENT DOCUMENTS

| | | |
|---|---|---|
| EP | 0788052 | 8/1997 |
| GB | 2032149 | 4/1980 |
| WO | WO97/00476 | 1/1997 |
| WO | 97/35262 | 9/1997 |
| WO | WO98/13753 | 4/1998 |
| WO | 98/49643 | 11/1998 |
| WO | WO98/49643 | 11/1998 |

OTHER PUBLICATIONS

A printout of a Web Site entitled "Structure of a UTM application", Concepts and Functions, Chapter 5, paragraph 3, p. 67, published Feb., 1997.

A printout of a Web Site entitled "System-internal procedures", Performance Handbook, Chapter 5.3.1: Managing the resource main memory, published Feb., 1997.

A printout of a Web Site entitled "Rapid Resume", retrieved by the Examiner on Feb. 16, 2000.

A printout of a Web Site entitled Aglets Specification (1.0), by Oshima et al., retrieved by the Examiner on May 18, 2000.

An article entitled, "JAFMAS: A Multiagent Application Development System", by Chauhan et al., Proceedings of the Second International Conference of Autonomous Agents, Minneapolis, MN; May 10-13, 1998, pp. 100-107.

An article entitled "Solve real problems with aglets, a type of mobile agent", by Venners, JavaWorld, May 1997.

An article entitled "Agent Design Patterns: Elements of Agent Application Design", by Aridor et al., Proceedings of the Second International Conference of Autonomous Agents, Minneapolis, MN; May 10-13, pp. 108-115.

A printout of a Web Sited entitled "The Dynamic Binder Loader/Starter", published Apr., 1993.

An article entitled "Dynamic Software Agents for Business Intelligence Applications", by Chen et al., Proceedings of the Second International Conference of the Autonomous Agents, Minneapolis, MN; May 10-13, pp. 453-454.

PKZIP (R) FAST! Create/Update Utility Version 2.04g, Jan. 2, 1993.

An article by Hylton et al., entitled "Knowbot Programming: System Support for Mobile Agents", Corporation for National Research Initiatives, 1996.

Microsoft Office 97, 1997; Power Point 97, Pack&Go, Save as HTML; Outlook 97.

Aptiva Handbook (IBM), published Jun., 1996.

A printout of a Web Site entitled "Rapid Resume", retrieved by the Examiner on Feb. 16, 2000.

A printout of a Website entitled "Scheduler", retrieved by the Examiner on Mar. 7, 2000.

Douglas et al., "Transparent Process Migration: Design Alternatives and the Sprite Implementation", Software Practice and Experience 21(8), Aug., 1991, pp. 757-786.

Artsy et al., "Designing a Process Migration Facility: The Charlotte Experience", IEEE Computer 22(9), Sep., 1989, pp. 47-56.

Milojicic et al., "Task Migration on Top of the Mach Microkernel", Proceedings of the USENIX Mach III Symposium, 1993, pp. 273-289.

Steketee et al., Implementation of Process Migration in Amoeba, Proceedings of the 14th International Conference on Distributed Computing Systems, 1994.

An article by Litzkow et al., entitled "Checkpoint and Migration of UNIX Processes in the Condor Distributed Processing Systems", Dr. Dobbs Journal, Feb., 1995.

Byline, "Legent Downsizes Software Distribution Pck", Journal: Network World Top News Section Text, published Feb. 7, 1994.

Microsoft Office 97, 1997; Power Point 97, Pack&Go, Save as HTML; Outlook 97; Scheduler, pp. 876-877.

Aptiva Handbook (IBM), published Jun., 1996, along with an English language translation of the same.

A printout of a Web Site entitled "Rapid Resume", retrieved by the Examiner on Feb. 16, 2000.

A printout of a Website entitled "Scheduler", retrieved by the Examiner on Mar. 7, 2000.

A printout of a Web Site entitled Aglets Specification (1.0), by Oshima et al., retrieved by the Examiner on May 18, 2000.

* cited by examiner

METHOD OF DETACHING AND RE-ATTACHING COMPONENTS OF A COMPUTING PROCESS

BACKGROUND

This invention relates to a method for detaching and re-attaching components of a computing process, and in particular for example to such a method for removing parts of the data, program code and execution state of a process and for transferring those parts to secondary or tertiary storage where they may be stored while not needed, before being re-attached to the process when required once more.

In a number of computing environments a large number of processes may be running concurrently on a single machine. This can happen for example in a follow-me computing environment where processes can span multiple user sessions. This results in a large number of processes—some active, some suspended—on a single machine. The presence of such a large number of concurrent processes can place a heavy burden on the resources of the system and can substantially slow down the running speed of the system.

A similar problem can occur in networks involving computing devices that may have limited memory space. Unless the memory space of such devices is used with maximum efficiency, the memory can quickly become overloaded. Minimizing resource usage is therefore imperative.

It would therefore be desirable if it were possible for elements of a computing process that were temporarily not required to be removed from the limited device or network and stored in such a way that they could be re-integrated into the process at a later time when required.

Recent years have seen a number of developments in computing science regarding how elements within a software application are treated and handled. In this context the most basic elements to be found within a software application are data and program modules. Traditional procedural programming paradigms focus on the logic of the software application, so a program is structured based on program modules. One uses the program modules by explicitly supplying to them the data on which they should operate.

More recently there has been a move towards an object-oriented paradigm. In this paradigm, programs are structured around objects, with each object representing an entity in the world being modeled by the software application. Each object manages its own data (state), which are hidden from the external world (other objects and programs). An object in a program interacts with another object by sending it a message to invoke one of its exposed program modules (method). This paradigm imposes better control and protection over internal data, and helps to structure complex applications designed and implemented by a team of programmers. An example of an object-oriented environment can be found in U.S. Pat. No. 5,603,031. This discloses an environment in which new agents (essentially objects) consisting of data and program modules can be sent between machines. However, in the environment of U.S. Pat. No. 5,603,031 a special application code is needed to convert state information into data in the newly created process, and to ensure that the latter begins execution from the right instruction. Since execution state cannot be manipulated directly, it is very tedious, if not impossible, to transfer shared resources within a process to a surrogate. Moreover since the surrogate has a different identity from the original process, shared resources managed externally, such as data locks, cannot be transferred.

While object-oriented paradigm represents a significant advance in software engineering, the data and modules that constitute each object are static. The paradigm is still inadequate for writing programs that must evolve during execution, eg programs that need to pick up, drop, or substitute selected modules. There have been several attempts at overcoming this limitation. For example, work described in U.S. Pat. Nos. 4,954,941, 5,175,828, 5,339,430 and 5,659,751 address techniques for re-linking or re-binding selected software modules dynamically during runtime. Also Microsoft's Win32 provides for explicit mapping and un-mapping of dynamic linked libraries into the address space of a process through the LoadLibrary and FreeLibrary calls. With this prior art, however, the prototype or specification of functions and symbols are fixed beforehand and compiled into application programs. This enables a process to mutate into and back from a surrogate by replacing selected program modules. However, the replacement modules must retain the same function prototypes making coding complicated and unnatural. Also data structures that are not needed by the surrogate remain in memory.

Work has also been done in the area of process checkpointing and recovery. This deals with mechanisms for preserving process state and recovery from machine crashes. The mechanisms operate from outside of the process and the process remains the same upon resumption.

SUMMARY

In this specification the following terms will be used with the following meaning:

"First class entity": an object that can be manipulated directly.

"Process": a combination of data, program module(s) and current execution state.

"Execution state": the values and contents of transient parameters such as the contents of registers, frames, counters, look-up tables and the like.

According to the present invention there is provided a method for removing a part of a computing process, wherein said process splits into a first process and a sub-process, the sub-process comprising items of data and/or program code and/or execution states of said computing process temporarily not required by said first process.

By means of this arrangement a process is enabled to temporarily or permanently detach from itself sub-processes comprising subsets of the data, program code and execution states of the process, and to remove the sub-process to, for example, secondary or tertiary storage until they are needed again. This compacts the size of the process, freeing up resources for other processes. If the sub-process is not required again it may be discarded completely. The sub-process may comprise only data, or only program code or only execution state information, or any combination of these three components.

The method of the present invention may be implemented by two approaches. In a first approach the process splits into a first process and sub-processes with the first process retaining the process identity of the original computing process. Alternatively, if retaining original process identity is not required, the original process may split into two new processes.

In either event the sub-process may comprise data, program code and execution states that is permanently not required and which may be deleted, or it may comprise data, program code and execution states that is only temporarily not required and which may be partially or totally reacquired by the first process. Data, program code and execution states may be temporarily not required by the first process generally, or may be specific to a particular user of computing means who may be temporarily absent from the computing means. In either case temporarily removing the sub-process frees up resources for the first process.

The method is founded upon the ability of a process to manipulate its own data, program code and execution state directly. This ability enables a process to split itself into a first process and a second sub-process.

In a preferred embodiment a construct is formed for storing the sub-process. This construct may be formed by a construct operation that suspends all active threads of the computing process and creates a new process comprising at least some of the data and/or program modules and/or execution state of the computing process, and stores the new process in a data area of the computing process.

In a preferred embodiment the construct comprises only data, program modules and execution state falling within lists that are passed to the construct operation.

Optionally the construct may be provided with an authorising signature.

If desired, following formation of a construct storing the sub-process the construct may be sent to a memory storage device from which the construct may be retrieved when required once more.

While running the first process may re-acquire data, program codes and execution states from the sub-process as and when required. The first process may also load selected program modules as required.

When it is time to restore the original process, the first process may simply drop off any unwanted extraneous data, program code and execution states that it may have picked up during execution, and then merges with the sub-process to pool together their data, program code and execution states.

BRIEF DESCRIPTION OF THE DRAWINGS

An embodiment of the invention will now be described by way of example and with reference to the accompanying drawings, in which:—

DETAILED DESCRIPTION

Figure 1:
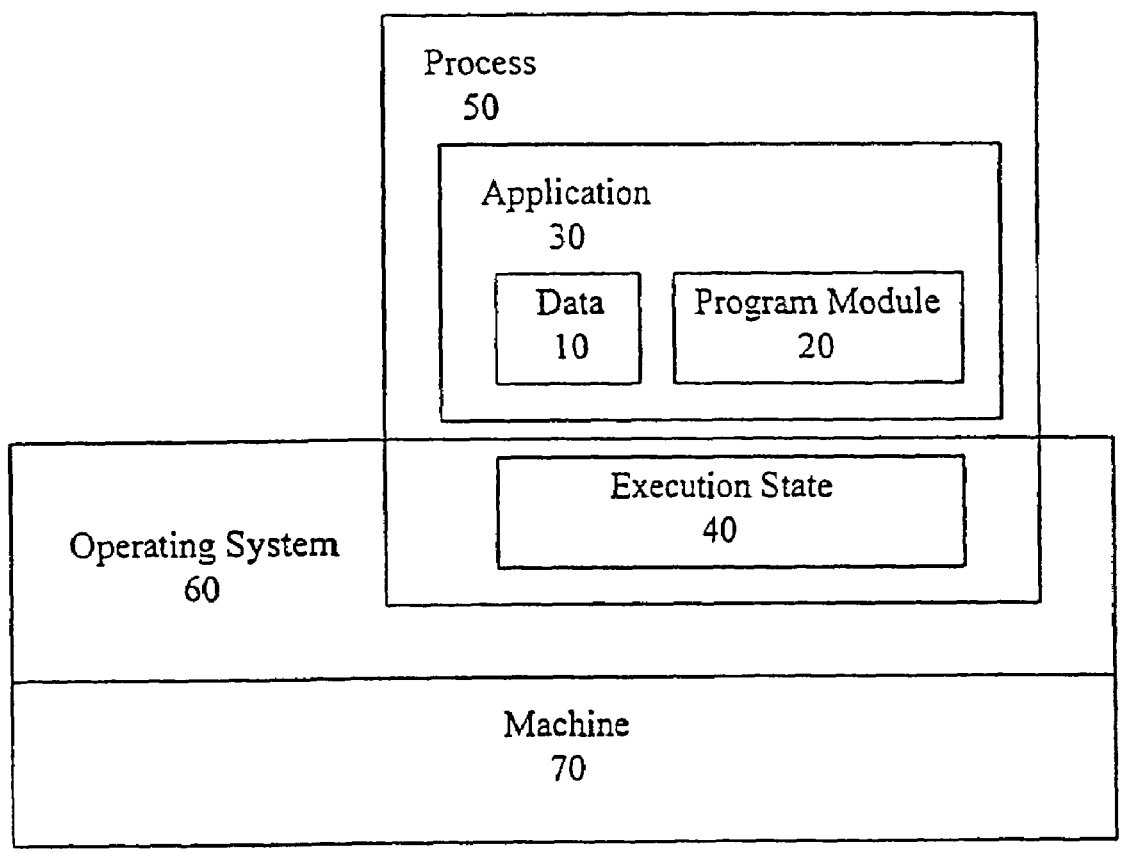
FIG. 1 is a general schematic model of an operating environment of a computing system.

FIG. 1 shows the general model of a computing system. An application program 30 comprises data 10 and program modules 20. The operating system 60, also known as the virtual machine, executes the application 30 by carrying out the instructions in the program modules 20, which might cause the data 10 to be changed. The execution is effected by controlling the hardware of the underlying machine 70. The status of the execution, together with the data and results that the operating system 60 maintains for the application 30, form its execution state 40.

Such a model is general to any computing system. It should be noted here that the present invention starts from the realisation that all the information pertaining to the application at any time is completely captured by the data 10, program modules 20 and execution state 40, known collectively as the process 50 of the application 30.

The process 50 can have one or more threads of execution at the same time. Each thread executes the code of a single program module at any given time. Associated with the thread is a current context frame, which includes the following components:

A set of registers

A program counter, which contains the address of the next instruction to be executed Local variables of the module Input and output parameters of the module Temporary results of the module In any module A, the thread could encounter an instruction to invoke another module B. In response, the program counter in the current frame is incremented, then a new context frame is created for the thread before it switches to executing module B. Upon completing module B, the new context frame is discarded. Following that, the thread reverts to the previous frame, and resumes execution of the original module A at the instruction indicated by the program counter, i.e., the instruction immediately after the module invocation. Since module B could invoke another module, which in turn could invoke some other module and so on, the number of frames belonging to a thread may grow and reduce with module invocations and completions. However, the current frame of a thread at any given time is always the one that was created last. For this reason, the context frames of a thread are typically stored in a stack with new frames being pushed on and popped from the top. The context frames of a thread form its execution state, and the state of all the threads within the process 50 constitute its execution state 40 in FIG. 1.

The data 10 and program modules 20 are shared among all threads. The data area is preferably implemented as a heap, though this is not essential. The locations of the data 10 and program modules 20 are summarized in a symbol table. Each entry in the table gives the name of a datum or a program module, its starting location in the address space, its size, and possibly other descriptors. Instead of having a single symbol table, each process may alternatively maintain two symbol tables, one for data alone and the other for program modules only, or the process could maintain no symbol table at all.

In a preferred embodiment of the present invention, the data and program code of a process are stored in a heap and a program area respectively and are shared by all the threads within the process. In addition the execution state of the process comprises a stack for each thread, each stack holding context frames, in turn each frame containing the registers, local variables and temporary results of a program module, as well as addresses for further module invocations and returns. Before describing an embodiment of the invention in more detail, however, it is first necessary to introduce some definitions of data types and functions that are used in the embodiment and which will be referred to further below.

In addition to conventional data types such as integers and pointer, four new data types Data, Module, Stack and Hibernaculum are defined in the present invention:

Data: A variable of this data type holds a set of data references. Members are added to and removed from the set by means of the following functions;

Int AddDatum(Data d, String dataname) inserts the data item dataname in the heap of the process as a member of d.

Int DelDatum(Data d, String dataname) removes the data item dataname from d.

Module: A variable of this data type holds a set of references to program modules. Members are added to and removed from the set with the following functions;

Int AddModule(Module d, String modulename) inserts the program module modulename in the program area of the process as a member of d.

Int DelModule(Module d, Stringname modulename) removes the program module modulename from d.

Stack: A variable of this data type holds a list of ranges of execution frames from the stack of the threads. The list may contain frame ranges from multiple threads, however no thread can have more than one range. Variables of this type are manipulated by the following functions:

Int OpenFrame(Stack d, Thread threadname) inserts into d a new range for the thread threadname, beginning with the thread's current execution frame. This function has no effect if the thread already has a range in d.

Int CloseFrame(Stack d, Thread threadname) ends the open-ended range in d that belongs to the thread threadname. This function has no effect if the thread does not currently have an open-ended range in d.

Int PopRange(Stack d, Thread threadname) removes from d the range belonging to the thread threadname.

Hibernaculum: A variable of this data type is used to hold a suspended process.

Figure 3:
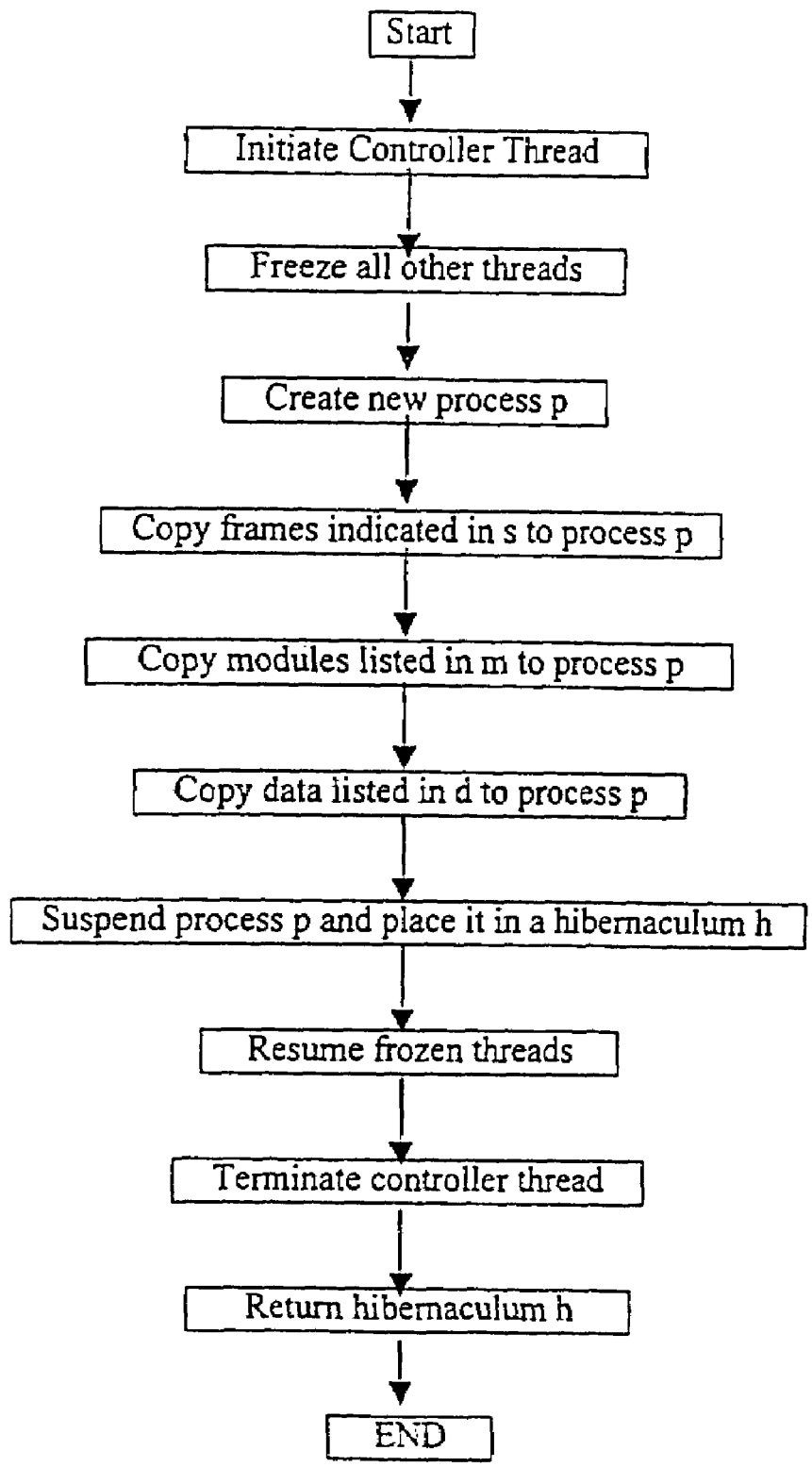
FIG. 3 is a flowchart illustrating the hibernaculum Construct operation.

As will be explained in more detail below a process may be suspended and stored in a construct formed by the following operation:

Hibernaculum Construct(Stack s, Module m, Data d): This operation creates a new process with the execution state, program table and data heap specified as input parameters. The process is immediately suspended and then returned in a hibernaculum. The hibemaculum may be signed by the originating process as indication of its authenticity. FIG. 3 is a flow-chart showing the hibernaculum construct operation.

A hibernaculum may be sent between operating environments by the following send and receive functions:

Int Send(Hibemaculum h, Target t) transmits the process contained within h to the specified target.

Hibernaculum Receive(Source s) receives from the specified source a hibemaculum containing a process.

Figure 5:
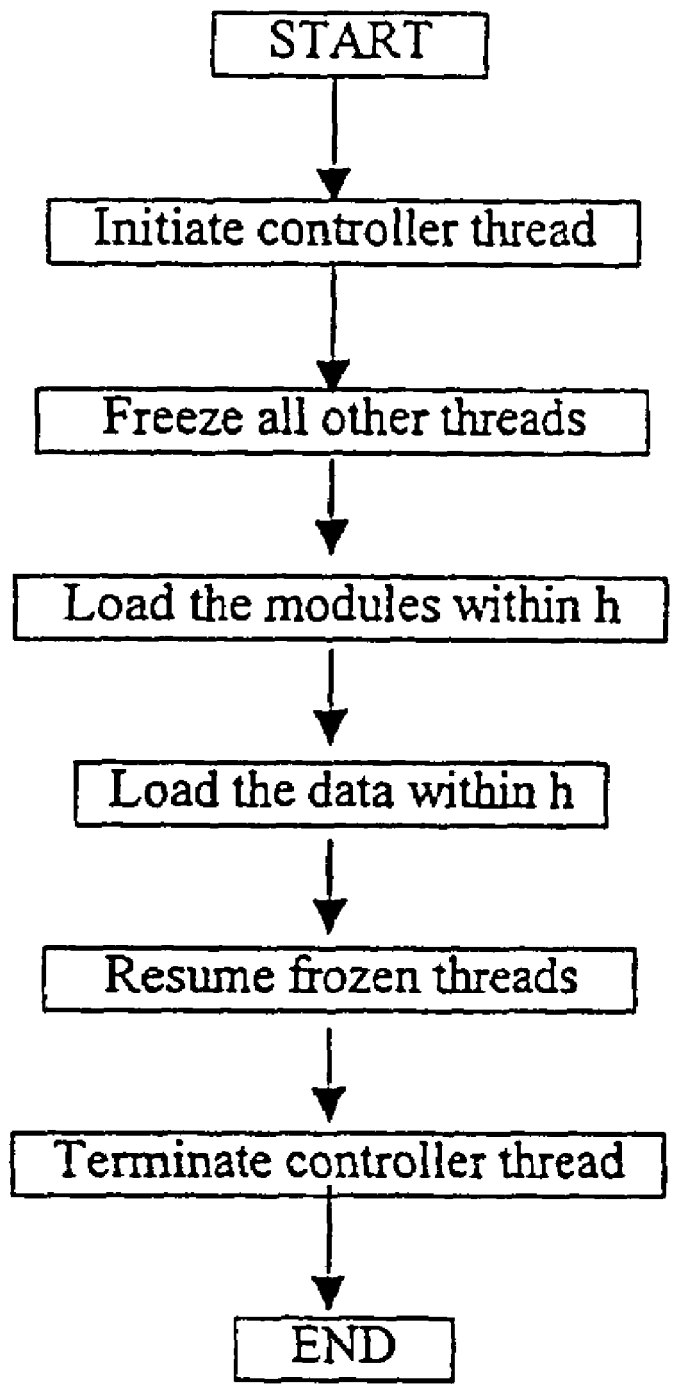
FIG. 5 is a flowchart illustrating the Usurp operation.

A hibernaculum may be subject to the following functions:

Int Usurp(Hibernaculum h, OverrideFlags f) copies the data and program modules of the process within h into the calling process's operating environment. Where there is a conflict between the data and/or program modules of the hibemaculum and the operating environment, the override flags specify which to preserve. FIG. 5 is a flow-chart illustrating the steps of the usurp operation.

Figure 6:
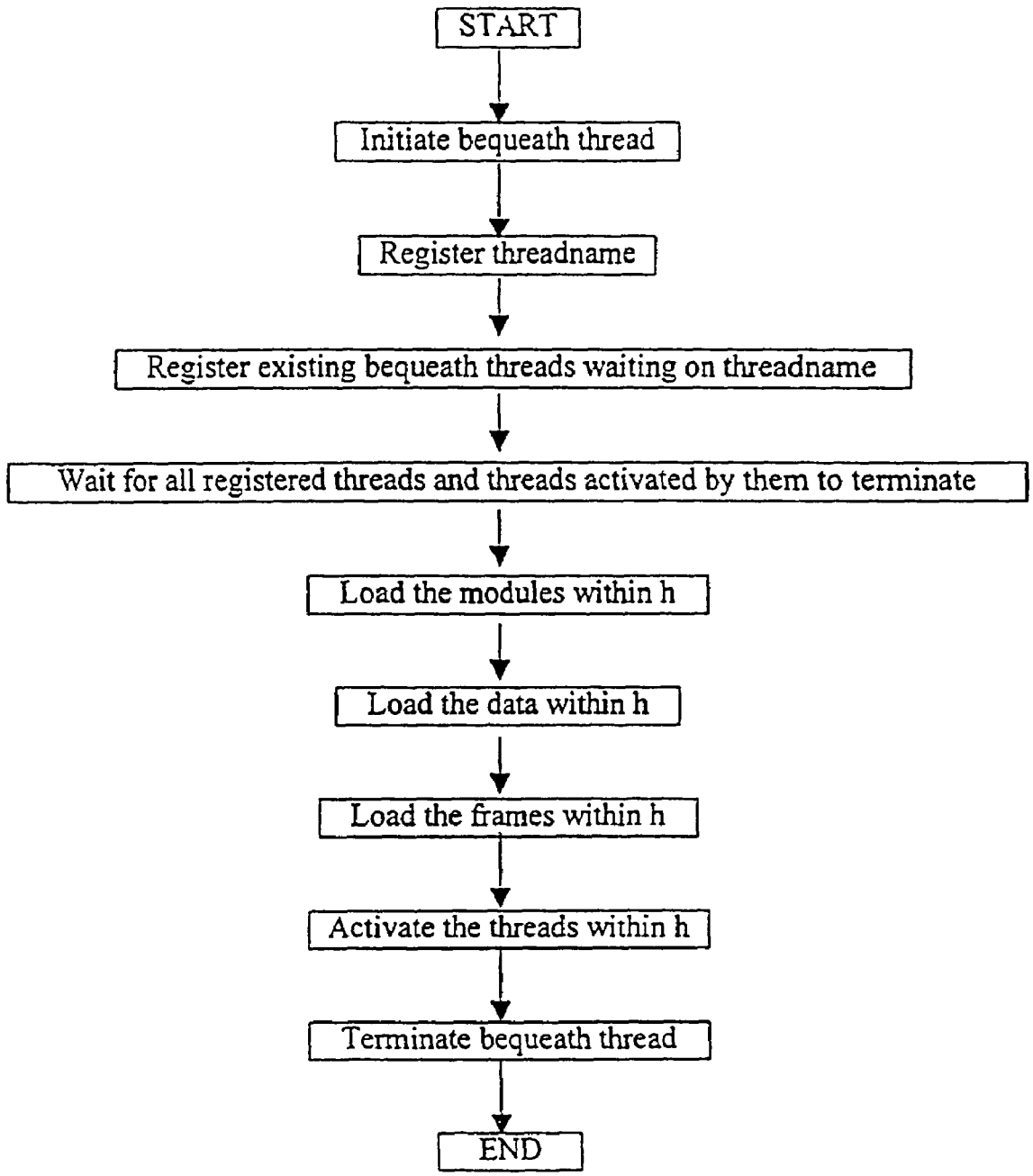
FIG. 6 is a flowchart illustrating the Bequeath operation.

Int Bequeath(Hibernaculum h, Thread threadname, OverrideFlags f), upon threadname's termination, activates the threads of the process stored within h and runs them as threads within the environment of the process containing threadname. Where there is a conflict between the data and/or program modules of the hibernaculum and the calling process, the override flags specify which is to be preserved. FIG. 6 is a flow-chart illustrating the steps of the bequeath operation.

Figure 4:
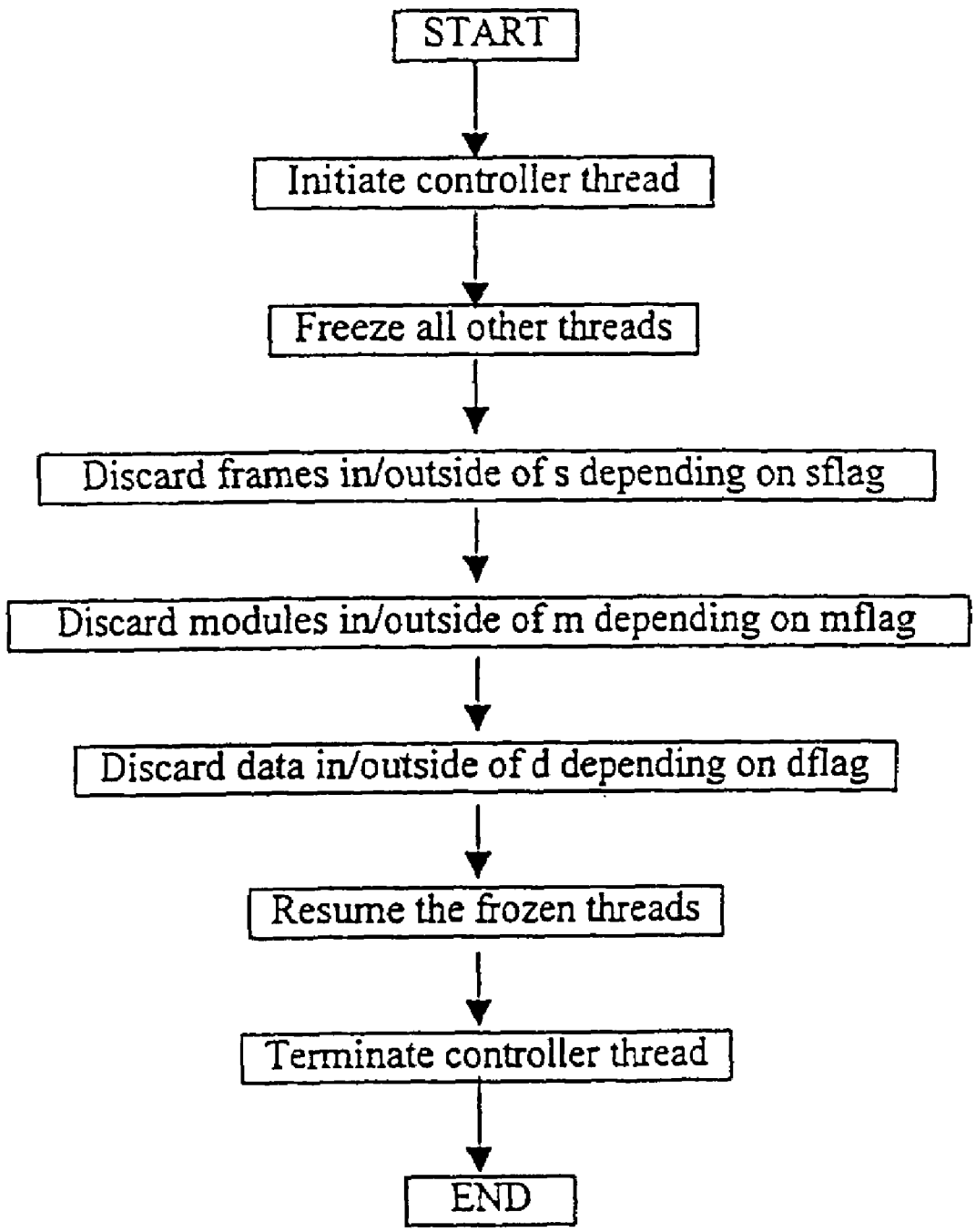
FIG. 4 is a flowchart illustrating the Mutate operation.

Int Mutate(Stack s, int sFlag, Module m, int mflag, Data d, int dflag) modifies the execution state, program table and data heap of the calling process. If a thread has an entry in s, only the range of execution frames specified by this entry is preserved, the other frames are discarded. Execution stacks belonging to threads without an entry in s are left untouched. In addition, program modules listed in m and data items listed in d are kept or discarded depending on the flag status. FIG. 4 is a flow-chart illustrating the steps of the mutate operation.

In the following exemplary embodiment of the invention we shall assume that a user of a computing device is about to leave his machine and wishes to remove parts of a process to secondary or tertiary storage, while retaining enough of the data, program code and execution states to manage and respond to events on resources (eg network sockets and data locks) that are shared with the external world (eg other processes). Removing temporarily unwanted sub-processes frees up resources for other processes and/or users.

Figure 2:
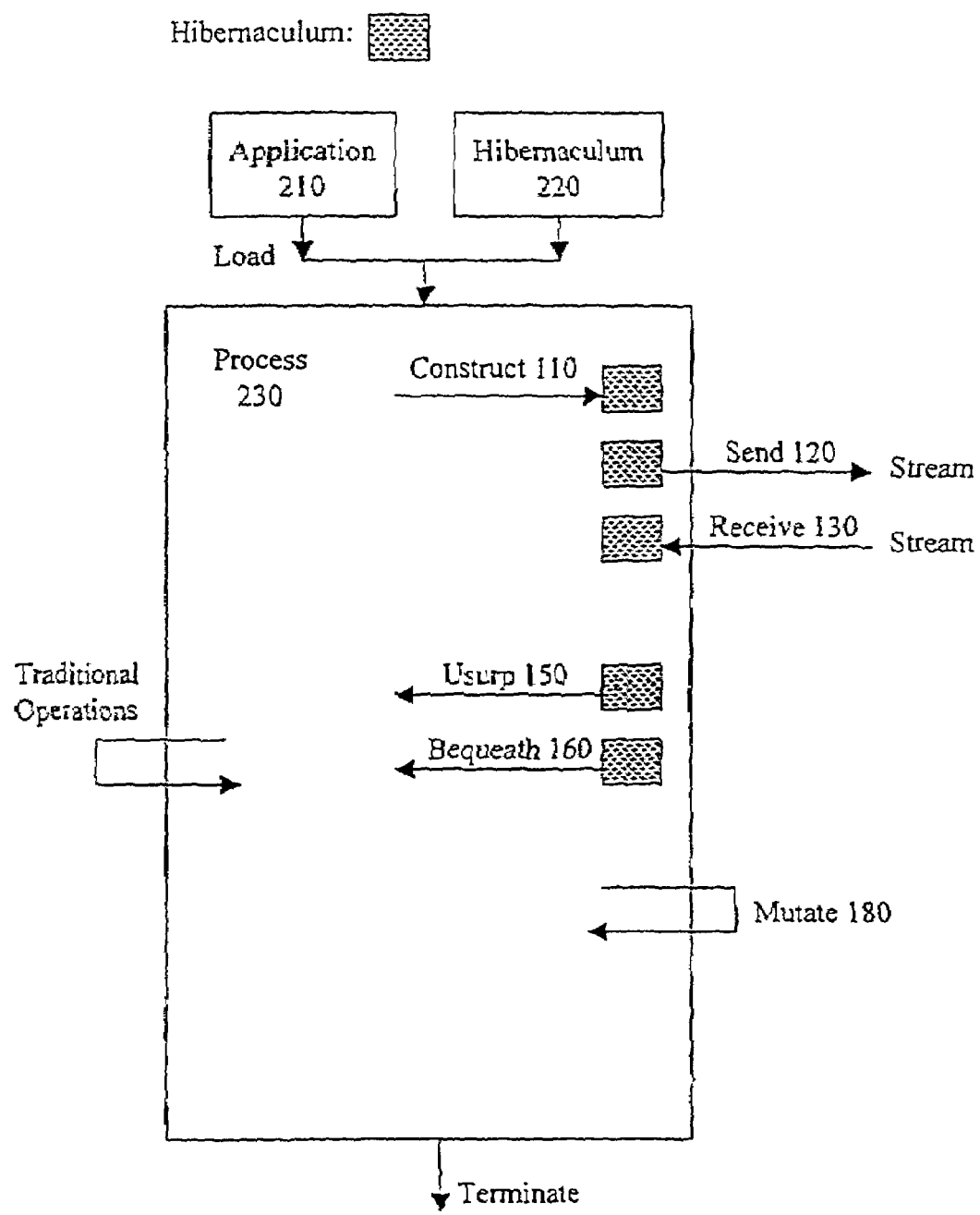
FIG. 2 schematically illustrates a process life-cycle and operations that may be carried out on the process.

In the example that follows a number of operations that act upon a process are invoked by the process. These operations are Construct, Mutate, Usurp and Bequeath. Before describing the example in detail these operations—which are schematically illustrated in FIG. 2—will be discussed.

New processes are created with a Construct 110 operation. FIG. 3 is a flow-chart showing the steps of this Construct operation. Each invocation of this operation starts up a controller thread in the process 230. The controller thread freezes all other active threads in the process 230, then creates a new process with some or all of the execution state, program modules and/or data of the process 230 except for those belonging to the controller thread, before resuming the frozen threads. Therefore, the new process contains no trace of the controller thread. The new process is suspended immediately and returned in a hibernaculum in the data area of the process 230. As explained earlier, a hibernaculum is a special data type that serves the sole purpose of providing a container for a suspended process. Since a process may have several hibernacula in its data area, it could create a new hibernaculum that contains those hibernacula, each of which in turn could contain more hibernacula, and so on. When the new process is activated subsequently, only those threads that were active just before the Construct 110 operation will begin to execute initially; threads that were suspended at that time will remain suspended. At the end of the Construct 110 operation, the controller thread resumes those threads that were frozen by it before terminating itself.

To specify what execution state should go into the new process, the Construct 110 operation is passed a list of ranges of context frames. The list may include frames from the state of several threads. No thread is allowed to have more than one range in this list. A thread can specify that all of its frames at the time of the Construct 110 operation are to be included in the list, by calling the AllFrame function beforehand. Alternatively, the thread can call the OpenFrame function to register its current frame, so that all the frames from the registered frame to the current frame at the time of the Construct 110 operation are included in the list. The thread can also call the CloseFrame function subsequently, to indicate that only frames from that registered with OpenFrame to the current frame at the time of calling CloseFrame are to the included in the list for the Construct 110 operation. An AllFrame or OpenFrame request for a thread erases any previous AllFrame, OpenFrame and CloseFrame requests for that thread. A CloseFrame request overrides any earlier CloseFrame request for the same thread, but the request is invalid if the thread has not already had an OpenFrame request. A thread can also make AllFrame, OpenFrame and/or CloseFrame requests on behalf of another thread by providing the identity of that thread in the requests; the effect is as if that thread is making those requests itself.

The Construct 110 operation can also be passed a list of program modules that should go into the newly created process. A thread can specify that all modules of the process 230 are to be included in the list, by calling the AllModules function prior to the Construct 110 operation. Alternatively, the thread can call the AddModule function to add a specific module to the list, and the DelModule function to remove a specific module from the list. The effect of the AllModules, AddModule and DelModule requests, possibly made by different threads, are cumulative. Hence a DelModule request after an AllModules request would leave every module in the list except for the one removed explicitly, and a DelModule can be negated with an AddModule or AllModules request. As there could be multiple AddModule requests for the same module and AllModules could be called multiple times, a program module may be referenced several times in the list. However, the Construct 110 operation consolidates the entries in the list, so no program module gets duplicated in the new process.

To copy some or all of the data of the process 230 to the new process, the Construct 110 operation can be passed a data list. This list contains only the name of, or reference to data that should be copied. The actual data content or values that get copied to the new process are taken at the time of the Construct 110 operation, not at the time that each datum is added to the list. To ensure consistency among data that could be related to each other, all the threads in the process 230 are frozen during the Construct 110 operation. A thread can specify that all data of the process 230 are to be included in the list, by calling the AllData function prior to the Construct 110 operation. Alternatively, the thread can call the AddDatum function to add a specific datum to the list, and the DelDatum function to remove a specific datum from the list. The effect of the AllData, AddDatum and DelDatum requests, possibly made by different threads, are cumulative. Hence a DelDatum request after an AllData request would leave all of the data in the list except for the one removed explicitly, and a DelDatum can be negated with an AddDatum or AllData request. As there could be multiple AddDatum requests for the same datum and AllData could be called multiple times, a datum may be referenced several times in the list. However, the Construct 110 operation consolidates the entries in the list, so no datum gets duplicated in the new process.

Since the lists passed to the Construct 110 operation are constructed from the execution state, program modules and data of the process 230, the new process initially does not contain any component that is not found in the process 230. Consequently, the symbol table in the new process is a subset of the symbol table of the process 230. Threads in the process 230 that do not have any frame in the new process are effectively dropped from it. For those threads that have frames in the new process, when activated later, each will begin execution at the instruction indicated by the program counter in the most recent frame amongst its frames that are copied. By excluding one or more of the most recent frames from the new process, the associated thread can be forced to return from the most recent module invocations. An exception is raised to alert the thread that those modules are not completed normally. Alternatively, the thread can be made to redo those modules upon activation, by decrementing the program counter in the most recent frame amongst those frames belonging to that thread that are copied. Similarly, by excluding one or more of its oldest frames from the new process, a thread can be forced to terminate directly after completing the frames that are included.

The process 230 can also modify any of its components directly by calling the Mutate 180 operation from any thread. FIG. 4 shows the flow-chart for the Mutate operation. The operation starts up a controller thread in the process 230. The controller thread first freezes all other active threads in the process 230, then selectively retains or discards its execution state, program modules and data. A list of context frames, together with a flag, can be passed to the Mutate 180 operation to retain or discard the frames in the list. Similarly, a program module list and/or a data list can be provided to indicate program modules and data of the process 230 that should be retained or discarded. The generation of the execution state, program module and data lists are the same as for the Construct 110 operation. After mutation, the controller thread resumes the threads that were frozen by it before terminating itself. Threads that no longer have a context frame in the process 230 are terminated. Each of the remaining threads resumes execution at the instruction indicated by the program counter in the most recent frame amongst the retained frames belonging to that thread. By discarding one or more of its most recent frames, a thread can be forced to return from the most recent module invocations. An exception is raised to alert the thread that those modules are not completed normally. Similarly, by discarding one or more of its oldest frames, a thread can be forced to terminate directly after completing the frames that are retained. Space freed up from the discarded context frames, program modules and data is automatically reclaimed by a garbage collector.

The Usurp 150 operation, which also accepts a hibemaculum as input, enables the process 230 to take in only program modules and data from a hibernaculum, without acquiring its threads. FIG. 5 is a flow-chart showing this operation in detail. The operation starts up a controller thread in the process 230. The controller thread freezes all other active threads in the process 230, adds the program modules and data of the process in the hibemaculum to the program modules and data of the process 230, respectively, and updates its symbol table accordingly. In case of a name conflict, the program module or data from the hibemaculum is discarded in favor of the one from the process 230 by default. However, a flag can be supplied to give preference to the hibemaculum. Finally, all the original threads in the process 230 that were frozen by the controller thread are resumed before it terminates itself.

The Bequeath 160 operation accepts a hibemaculum and a thread reference as input. FIG. 6 is a flow-chart showing this operation in detail. It starts up a bequeath-thread in the process 230. The bequeath-thread registers the referenced thread and any existing bequeath-threads on that thread, then allows them to carry on execution without change. After all those threads and threads that they in turn activate have terminated, the bequeath-thread loads in the context frames, program modules and data in the hibernaculum. In case of a name conflict, the program module or data from the hibernaculum is discarded in favor of the one from the process 230 by default. However, a flag can be supplied to give preference to the hibemaculum. Subsequently, threads within the hibemaculum are activated to run in the process 230 before the bequeath-thread terminates itself. Only those threads that were active just before the hibernaculum was created are activated initially; threads that were suspended at that time remain suspended. Each newly acquired thread begins execution at the instruction indicated by the program counter in the most recent frame amongst the context frames that belong to that thread. If multiple Bequeath 160 requests are issued for the same thread, there will be several bequeath-threads in the process 230. Each bequeath-thread will wait for all the existing bequeath-threads on the same thread, together with all the threads that they activate, to terminate before performing its function. As a result, the Bequeath 160 requests are queued up and serviced in chronological order.

A process stored in a hibernaculum may also be transmitted to another device (for example a storage device) by the Send operation 120 and similarly may be received by the receive operation 130.

To begin the process p1 that is to be split calls the function Hibernaculum Construct:

> Hibernaculum h=Construct(Stack s, Module m, Data d)
> where s, m, and d contain the execution stacks, program modules and data, respectively, in process p1 that are not required in order to respond to events on shared resources. This function creates a new process p2 to hold those heap, program table and execution states. The new process p2 is immediately suspended and returned within a hibernaculum h.

This Hibernaculum Construct operation is shown in the flowchart of FIG. 3 and the result is a construct that holds the temporarily non-required sub-process.

The process p1 then calls the mutate function:

> Int Mutate(Stack—s, Module—m, Data—d)

which discards from p1 the execution stacks, program modules and data specified in s, m and d respectively (ie the data held in the hibernaculum h). As a result p1 now holds only those data, program modules and execution states of the original process that are needed to respond to events on shared resources. It should be noted that the mutated process retains the same process identity, ie p1, as the original process. This mutate operation is shown in the flowchart of FIG. 4. It should be noted here that while in this embodiment the first or active process retains the process identity of the original process, this is not essential and in an alternative the Construct operation can be used to generate a first process having a new process identity.

The mutated process p1 loads in appropriate event handling modules, then waits for incoming events. As p1 executes, the process may load in additional program modules, or may acquire data, program modules or execution states from the dormant process p2 using the function:

> Int Usurp(Hibernaculum h, Stack s, Module m, Data d)

to take in from p2, which resides in the hibernaculum h, the execution stack, the program modules and data specified by s, m and d (and which may be a subset of those parameters held in the hibernaculum h). The usurp operation is shown in the flowchart of FIG. 5.

When the user returns to the machine and wishes to restore the original process the mutated process p1 calls the function:

> Int Mutate(Stack s, Module m, Data d)

where s, m and d contain the execution stacks, program modules and data that must be passed back to the original process. This discards any extraneous data, program code and/or execution states loaded in the user's absence.

Next p1 calls the function:

> Int Bequeath(Hibernaculum h)

and quits. This results in all the execution stacks, program modules and data remaining in p1 being added to the dormant process p2 in the hibernaculum, and in p2 then being activated when p1 terminates. The Bequeath operation is shown in the flowchart of FIG. 6.

It should also be understood that the dormant process p2 while held in the hibernaculum h could, if desired, be transmitted to another device such as a memory storage device, by using the Send operation 120. The dormant process p2 will then be re-transmitted and received using the receive operation 130 prior to the dormant process p2 being reattached to the original process. This would allow the memory capacity of the original device to be fully utilised by not requiring it to store dormant processes which may instead be stored offline.

It will also be understood that while in the above embodiment the first process is described as an active process and the second as a dormant process at least part of which may be reacquired by the active process later, the second process may alternatively comprise data, program code and execution states that are to be permanently deleted from the computing process as they are no longer required.

To implement the method of detaching and reattaching processes of the present invention in a Java environment, a package called snapshot is introduced. This package contains the following classes, each of which defines a data structure that is used in the operations involved in the method:

```
public class Hibernaculum {
  . . .
}
public class State {
  . . .
}
public class Module {
  . . .
}
public class Data {
  . . .
}
public class Machine {
  . . .
}
```

In addition, the package contains a Snapshot class that defines the migration and adaptation operations:

```
public class Snapshot {
  private static native void registerNatives( );
  static {
    registerNatives( );
  }
  public static native Hibernaculum Construct(State s, Module m, Data d);
  public static native int Send(Hibernaculum h, OutputStream o);
  public static native Hibernaculum Receive(InputStream i);
  public static native int Usurp(Hibernaculum h, int f);
  public static native int Bequeath(Hibernaculum h, int f);
  public static native int Mutate(State s, Module m, int mflag, Data d, int dflag);
  // This class is not to be instantiated
  private Snapshot( ) {
  }
}
```

The methods in the Snapshot class can be invoked from application code. For example:

```
try {
  if (snapshot.Snapshot.Construct(s, m, d) !=null) {
    // hibernaculum has been created
  } else {
```

```
        // failed to create hibernaculum
      }
      catch(snapShot.SnapshotException e) {
        // Failed to create hibernaculum
      }
```
The operations are implemented as native codes that are added to the Java virtual machine itself, using the Java Native Interface (JNI). To do that, a Java-to-native table is first defined:
```
#define KSH "Ljava/snapshot/Hibernaculum;"
#define KSS "Ljava/snapshot/State;"
#define KSM "Ljava/snapshot/Module;"
#define KSD "Ljava/snapshot/Data;"
static     JNINativeMethod     snapshot_Snapshot_native_methods[ ]={
  {
    "Construct",
    "("KSSKSMKSD")"KSH,
    (void* )Impl_Snapshot_Construct
  },
  {
    "Send",
    "("KSH"Ljava/io/OutputStream;)I",
    (void*)Impl_Snapshot_Send
  },
  {
    "Receive",
    "(Ljava/io/InputStream;)"KSH,
    (void*)Impl_Snapshot_Receive
  },
  {
    "Usurp",
    "("KSH")I",
    (void*)Impl_Snapshot_Usurp
  },
  {
    "Bequeath",
    "("KSH")I",
    (void*)Impl_Snapshot_Bequeath
  },
  {
    "Mutate",
    "("KSSKSM"I"KSD")I",
    (void*)Impl_Snapshot_Mutate
  },
};
```
After that, the native implementations are registered via the following function:
```
JNIEXPORT void JNICALL
Java_snapshot_Snapshot_registerNatives(JNIEnv     *env,
    jclass cls) {
  (*env)->RegisterNatives( env,
    cls,
    snapshot_Snapshot_native_methods,
    sizeof(snapshot_Snapshot_native_methods)/
    sizeof(JNINativeMethod) );
}
```
Besides the above native codes, several functions are added to the Java virtual machine implementation, each of which realizes one of the migration and adaptation operations:
```
void* Impl_Snapshot_Construct(..) {
  // follow flowchart in FIG. 3
  ...
}
void* Impl_Snapshot_Send(..) {
  // send given hibernaculum to specified target
  ...
}
void* Impl_Snapshot_Receive(..) {
  // receive a hibernaculum from a specified source
  ...
}
void* Impl_Snapshot_Usurp(..) {
  // follow flowchart in FIG. 5
  ...
}
void* Impl_Snapshot_Bequeath(..){
  // follow flowchart in FIG. 6
  ...
}
void* Impl_Snapshot_Mutate(..) {
  // follow flowchart in FIG. 4
  ...
}
```

The invention claimed is:

1. A computer implemented method for removing a part of a computing process comprising items of data, program code and executing states, the method comprising:
splitting said computing process into a first process and a second sub-process, the second sub-process comprising a portion of the program code and/or a portion of the execution states of said computing process not required by said first process; and
forming a construct which stores said second sub-process, while said first process retains the process identity of said computing process,
wherein said second sub-process is a suspended process comprising data, program code and execution states of said computing process temporarily not required by said first process, and
wherein said first process is able to re-acquire data, program codes and execution states from said suspended process as and when required by said first process.

2. A computer implemented method as claimed in claim 1 wherein said sub-process further comprises items of data of said computing process.

3. A computer implemented method as claimed in claim 1 wherein said construct is formed by a construct operation that suspends all active threads of said computing process and creates a new sub-process comprising at least some of the data and/or program modules and/or execution state of said computing process, and stores said sub-process in a data area of said computing process.

4. A computer implemented method as claimed in claim 3 wherein said construct comprises only data, program modules and execution state falling within lists that are passed to said construct operation.

5. A computer implemented method as claimed in claim 1 wherein said construct is provided with an authorizing signature.

6. A computer implemented method as claimed in claim 1 wherein said construct is sent to a memory storage device.

7. A computer implemented method as claimed in claim 1 wherein said first process re-acquires data, program code and execution states from said suspended process falling within specified ranges.

8. A computer implemented method as claimed in claim 1 wherein said second sub-process comprises data, program code and execution states specific to a given user of a computing means, and wherein said second sub-process is formed to temporarily store said data, program code and execution states while said user is absent from said computing means.

9. A computer implemented method as claimed in claim 1 wherein after said first process finishes executing data, program code and execution states from said first process are added to said second sub-process and said second sub-process is reactivated.

10. A computer implemented method as claimed in claim 9 wherein said first process discards extraneous data, program codes and execution states acquired subsequent to the formation of said first process and said second sub-process prior to adding the program code and execution states from said first process to said second sub-process.

11. A computer implemented method as claimed in claim 1 wherein a construct is formed for storing said second sub-process, while said first process is run in place of said computing process.

12. A computer implemented method as claimed in claim 11 wherein said construct is formed by a construct operation that suspends all active threads of said computing process and creates a new sub-process comprising at least some of the data and/or program modules and/or execution state of said computing process, and stores said sub-process in a data area of said first process.

13. A computer implemented method as claimed in claim 12 wherein said construct comprises only data, program modules and execution state falling within lists that are passed to said construct operation.

14. A computer implemented method as claimed in claim 11 wherein said construct is provided with an authorizing signature.

15. A computer implemented method as claimed in claim 11 wherein said construct is sent to a memory storage device.

16. A computer implemented method as claimed in claim 1 wherein said first process re-acquires data, program code and execution states from said suspended process falling within specified ranges.

17. A computer implemented method as claimed in claim 11 wherein said second sub-process comprises data, program code and execution states specific to a given user of a computing means, and wherein said second sub-process is formed to temporarily store said data, program code and execution states while said user is absent from said computing means.

18. A computer implemented method as claimed in claim 11 wherein after said first process finishes executing data, program code and execution states from said first process are added to said second sub-process and said second sub-process is reactivated.

19. A computer implemented method as claimed in claim 18 wherein said first process discards extraneous data, program codes and execution states acquired subsequent to the formation of said first process and said second sub-process prior to adding the program code and execution states from said first process to said second sub-process.

20. A computer implemented method for removing a part of a computing process comprising items of data, program code and executing states, the method comprising
splitting said computing process into a first process and a second sub-process, the second sub-process comprising a portion of the program code and/or a portion of the execution states of said computing process not required by said first process;
forming a construct which stores said second sub-process, while said first process retains the process identity of said computing process;
after said first process finishes executing data, adding program code and execution states from said first process to said second sub-process and reactivating said second sub-process; and
discarding by said first process extraneous data, program codes and execution states acquired subsequent to the formation of said first process and said second sub-process prior to adding the program code and execution states from said first process to said second sub-process.

21. A computer implemented method for removing a part of a computing process comprising items of data, program code and executing states, the method comprising:
splitting said computing process into a first process and a second sub-process, the second sub-process comprising a portion of the program code and/or a portion of the execution states of said computing process not required by said first process; and
forming a construct which stores said second sub-process, while said first process is run in place of said computing process,
wherein said second sub-process is a suspended process comprising data, program code and execution states of said computing process temporarily not required by said first process, and
wherein said first process is able to re-acquire data, program codes and execution states from said suspended process as and when required by said first process.

22. A computer implemented method for removing a part of a computing process comprising items of data, program code and executing states, the method comprising:
splitting said computing process into a first process and a second sub-process, the second sub-process comprising a portion of the program code and/or a portion of the execution states of said computing process not required by said first process;
forming a construct which stores said second sub-process, while said first process is run in place of said computing process;
after said first process finishes executing data, adding program code and execution states from said first process to said second sub-process and reactivating said second sub-process; and
discarding by said first process extraneous data, program codes and execution states acquired subsequent to the formation of said first process and said second sub-process prior to adding the program code and execution states from said first process to said second sub-process.

* * * * *